United States Patent
Eschbach et al.

(10) Patent No.: US 8,460,781 B2
(45) Date of Patent: Jun. 11, 2013

(54) INFRARED ENCODING OF SECURITY ELEMENTS USING STANDARD XEROGRAPHIC MATERIALS

(75) Inventors: Reiner Eschbach, Webster, NY (US); Raja Bala, Webster, NY (US); Martin S Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1044 days.

(21) Appl. No.: 11/758,344

(22) Filed: Jun. 5, 2007

(65) Prior Publication Data

US 2008/0302263 A1    Dec. 11, 2008

(51) Int. Cl.
*B41F 31/00* (2006.01)

(52) U.S. Cl.
USPC .................... 428/195.1; 101/491; 356/51

(58) Field of Classification Search
USPC ............ 428/690, 32.76, 195.1; 313/501
See application file for complete search history.

(56) References Cited

U.S. PATENT DOCUMENTS

| | | | |
|---|---|---|---|
| 3,611,430 A | 10/1971 | Watchorn et al. | |
| 3,870,528 A | 3/1975 | Edds et al. | |
| 3,900,608 A | 8/1975 | Dierkes et al. | |
| 4,186,020 A | 1/1980 | Wachtel | |
| 4,374,643 A | 2/1983 | Suzuki et al. | |
| 4,384,069 A | 5/1983 | Wendel et al. | |
| 4,440,846 A | 4/1984 | Sanders et al. | |
| 4,603,970 A | 8/1986 | Aota et al. | |
| 4,604,065 A * | 8/1986 | Frazer et al. | 434/331 |
| 5,042,075 A | 8/1991 | Sato | |
| 5,256,192 A | 10/1993 | Liu et al. | |
| 5,286,286 A | 2/1994 | Winnik et al. | |
| 5,371,126 A | 12/1994 | Strickler | |
| 5,484,292 A * | 1/1996 | McTaggart | 434/317 |
| 5,514,860 A | 5/1996 | Berson | |
| 5,734,752 A | 3/1998 | Knox | |
| 5,790,703 A | 8/1998 | Wang | |

(Continued)

FOREIGN PATENT DOCUMENTS

| | | |
|---|---|---|
| EP | 0847016 A2 | 6/1998 |
| JP | 2194989(A) | 8/1990 |
| JP | 10251570(A) | 9/1998 |
| JP | 2005161792(A) | 8/2005 |

OTHER PUBLICATIONS

Eschbach et al., U.S. Appl. No. 11/758,359, filed simultaneously herewith, entitled. "Infrared Encoding of Security Elements Using Standard Xerographic Materials With Distraction Patterns".

(Continued)

*Primary Examiner* — Mark Ruthkosky
*Assistant Examiner* — Ian Rummel
(74) *Attorney, Agent, or Firm* — Fay Sharpe LLP

(57) ABSTRACT

The teachings as provided herein relate to a watermark embedded in an image that has the property of being relatively indecipherable under normal light, and yet decipherable under infrared illumination when viewed by a suitable infrared sensitive device. This infrared mark entails, a substrate reflective to infrared radiation, and a first colorant mixture and second colorant mixture printed as an image upon the substrate. The first colorant mixture layer in connection with the substrate has a property of strongly reflecting infrared illumination, as well as a property of low contrast under normal illumination against a second colorant mixture as printed in close spatial proximity to the first colorant mixture pattern, such that the resultant image rendered substrate suitably exposed to an infrared illumination, will yield a discernable image evident as a infrared mark to a suitable infrared sensitive device.

18 Claims, 3 Drawing Sheets

U.S. PATENT DOCUMENTS

| | | | |
|---|---|---|---|
| 5,847,713 | A | 12/1998 | Ueda |
| 6,013,307 | A | 1/2000 | Hauser et al. |
| 6,057,858 | A | 5/2000 | Desrosiers |
| 6,106,021 | A | 8/2000 | Phillips |
| 6,138,913 | A | 10/2000 | Cyr et al. |
| 6,252,971 | B1 | 6/2001 | Wang |
| 6,526,155 | B1 | 2/2003 | Wang et al. |
| 6,731,409 | B2 | 5/2004 | Wang et al. |
| 6,731,785 | B1 | 5/2004 | Mennie et al. |
| 6,773,549 | B1 | 8/2004 | Burkhardt |
| 6,865,001 | B2 | 3/2005 | Long et al. |
| 7,070,252 | B2 | 7/2006 | de Queiroz et al. |
| 7,092,128 | B2 | 8/2006 | Wang et al. |
| 7,099,019 | B2 | 8/2006 | Silverbrook et al. |
| 7,126,721 | B2 | 10/2006 | Wang et al. |
| 7,127,112 | B2 | 10/2006 | Sharma et al. |
| 7,148,999 | B2 | 12/2006 | Xu et al. |
| 7,180,635 | B2 | 2/2007 | Wang et al. |
| 7,198,382 | B2 | 4/2007 | Donovan |
| 7,213,757 | B2 | 5/2007 | Jones et al. |
| 7,215,817 | B2 | 5/2007 | de Queiroz et al. |
| 7,218,785 | B2 | 5/2007 | Sharma et al. |
| 7,224,489 | B2 | 5/2007 | Loce et al. |
| 7,286,682 | B1 | 10/2007 | Sharma et al. |
| 7,324,241 | B2 | 1/2008 | Eschbach et al. |
| 7,580,153 | B2 | 8/2009 | Eschbach et al. |
| 7,589,865 | B2 | 9/2009 | Eschbach et al. |
| 7,800,785 | B2 | 9/2010 | Bala et al. |
| 2003/0193184 | A1 | 10/2003 | Taylor et al. |
| 2005/0078851 | A1 | 4/2005 | Jones et al. |
| 2005/0152040 | A1* | 7/2005 | Goggins ................ 359/619 |
| 2007/0017990 | A1 | 1/2007 | Katsurabayashi et al. |
| 2007/0262579 | A1 | 11/2007 | Bala et al. |
| 2007/0264476 | A1 | 11/2007 | Bala et al. |
| 2008/0299333 | A1 | 12/2008 | Bala et al. |
| 2008/0305444 | A1 | 12/2008 | Eschbach et al. |
| 2009/0122349 | A1 | 5/2009 | Bala et al. |

OTHER PUBLICATIONS

Eschbach et al., U.S. Appl. No. 11/758,388, filed simultaneously herewith, entitled. "Infrared Encoding for Embedding Multiple Variable Data Information Collocated in Printed Documents".

Bala et al., U.S. Appl. No. 11/382,897, filed May 11, 2006, entitled "Substrate Fluorescence Mask for Embedding Information in Printed Documents".

Bala et al., U.S. Appl. No. 11/382,869, filed May 11, 2006, entitled "Substrate Fluorescence Pattern Mask for Embedding Information in Printed Documents".

Bala et al., U.S. Appl. No. 11/754,702, filed May 29, 2007, entitled Substrate Fluorescent Non-Overlapping Dot Patterns for Embedding Information in Printed Documents.

\* cited by examiner

INFRARED ENCODING OF SECURITY ELEMENTS USING STANDARD XEROGRAPHIC MATERIALS

CROSS-REFERENCE TO RELATED APPLICATIONS

Cross-reference is made to the following application filed simultaneously herewith and incorporated by reference herein: Eschbach et al., U.S. patent application Ser. No. 11/758,359 (U.S. Publication No. 2008-0305444), filed simultaneously herewith, entitled "INFRARED ENCODING OF SECURITY ELEMENTS USING STANDARD XEROGRAPHIC MATERIALS WITH DISTRACTION PATTERNS".

Cross-reference is made to the following applications which are incorporated by reference herein: Eschbach et al., U.S. patent application Ser. No. 11/758,359 (U.S. Publication No. 2008-0305444), filed simultaneously herewith, entitled "INFRARED ENCODING FOR EMBEDDING MULTIPLE VARIABLE DATA INFORMATION COLLOCATED IN PRINTED DOCUMENTS"; Bala et al., U.S. patent application Ser. No. 11/358,897 (U.S. Publication No. 2007-0264476), filed May 11, 2006, entitled "SUBSTRATE FLUORESCENCE MASK FOREMBEDDING INFORMATION INPRINTED DOCUMENTS"; Bala et al., U.S. patent application Ser. No. 11/382,869 (U.S. Publication No. 2007-0262579), filed May 11, 2006, entitled "SUBSTRATE FLUORESCENCE PATTERN MASK FOREMBEDDING INFORMATION IN PRINTED DOCUMENTS"; and Bala et al., U.S. patent application Ser. No. 11/754,702 (U.S. Publication No. 2008-0299333), filed May 29, 2007, entitled "SUBSTRATE FLUORESCENT NON-OVERLAPPING DOT PATTERNS FOR EMBEDDING INFORMATION IN PRINTED DOCUMENTS.

BACKGROUND AND SUMMARY

The present invention in various embodiments relates generally to the useful manipulation of infrared components found in toners as commonly utilized in various printer and electrostatographic print environments. More particularly, the teachings provided herein relate to at least one realization of infrared encoding of data elements or infrared marks.

It is desirable to have a way to provide for the detection of counterfeiting, illegal alteration, and/or copying of a document, most desirably in a manner that will provide document security and which is also applicable for digitally generated documents. It is desirable that such a solution also have minimum impact on system overhead requirements as well as minimal storage requirements in a digital processing and printing environment. Additionally, it is particularly desirable that this solution be obtained without physical modification to the printing device and without the need for costly special materials and media.

Watermarking is a common way to ensure security in digital documents. Many watermarking approaches exist with different trade-offs in cost, fragility, robustness, etc. One prior art approach is to use special ink rendering where the inks are invisible under standard illumination. These inks normally respond light outside the visible range and thereby may be made visible. Examples of such extra-spectral techniques are UV (ultra-violet) and IR (infrared). This traditional approach, is to render the encoded data with special inks that are not visible under normal light, but have strong distinguishing characteristics under the special spectral illumination. Determination of the presence or absence of such encoding may be thereby subsequently performed using an appropriate light source and detector. One example of this approach is found in U.S. Patent Application No. 2007/0017990 to Katsurabayashi et al., which is herein incorporated by reference in its entirety for its teachings. However, these special inks and materials are often difficult to incorporate into standard electro-photographic or other non-impact printing systems like solid ink printers, either due to cost, availability or physical/chemical properties. This in turn discourages their use in variable data printing arrangements, such as for redeemable coupons or other personalized printed media for example.

Another approach taken, is a document where copy control is provided by digital watermarking, as for example U.S. Pat. No. 5,734,752 to Knox, where there is provided a method for generating data encoding in the form of a watermark in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

With each of the above patents and citations, the disclosures therein are totally incorporated by reference herein in their entirety for their teachings.

Disclosed in embodiments herein, is an infrared mark or data encoding where the difference in visible response to infrared response is based on the metameric character of standard non-impact printing materials.

Further disclosed in embodiments herein, is a system for creating an infrared mark comprising two distinct colorant combinations that under normal illumination yield an identical or similar visual tristimulus response, but under infrared illumination can easily be distinguished using standard infrared sensing devices such as cameras.

Further disclosed in embodiments herein, is a system for creating an infrared mark employing the different infrared transmission characteristic of standard non-impact printing materials, specifically the different infrared transmission characteristics of the four or more printing colorants, whereby the application of such infrared transparent colorants on a substrate results in a high level of infrared reflectance of the combination due to the substrate reflectance characteristics. The infrared mark is created by printing the first colorant combination with a relatively high infrared reflectance in direct spatial proximity to a second colorant combination having the essentially same visual response under visible light, while having a different infrared reflectance by changing the relative amounts of the colorants in the mixture in a manner that is essentially invisible to the human eye under normal illumination.

Further disclosed in embodiments herein, is an infrared mark indicator comprising standard digital printing material (toner, ink, dye and the like) where the individual components (e.g.: 4 toners and one substrate) have at least in part differentiable IR characteristics, a first colorant mixture and a second colorant mixture printed as an image upon the substrate. The first colorant mixture when applied to a common substrate having a high infrared reflectance. The second colorant mixture is printed as an image upon the substrate in substantially close spatial proximity to the printed first colorant mixture. The second spatial color pattern having a low infrared reflectance when applied to a common substrate, and a property of low contrast against the first spatial color pattern under normal illumination. The arrangement is such that the resultant printed substrate image suitably exposed to visible light will have no obvious contrast or distinction between the two colorant mixture and under infrared illumination, will yield a discernable pattern evident as an infrared mark, by exhibiting discernible first and second levels of infrared reflection, made visible by a standard infrared sensitive sensing device, such as an infrared camera.

Further disclosed in embodiments herein, is an infrared mark indicator comprising an infrared reflecting substrate and a first colorant mixture printed as an image upon the substrate. The infrared mark indicator further comprises a second colorant mixture printed as an image upon the substrate in substantially close spatial proximity to the printed first colorant mixture. The resultant second colorant mixture has the property of high infrared reflectance in conjunction with the substrate, and a property of low visual contrast against the first colorant mixture, such that the resultant printed substrate image suitably exposed to an infrared illuminant, will yield a discernable pattern evident as a infrared mark when viewed with an infrared sensing device.

Further disclosed in embodiments herein, is a system for creating an infrared mark comprising an infrared reflective paper substrate and a digital color printing system. The digital color printing system further comprises at least one first colorant mixture printed as an image upon the substrate having a property of high infrared reflectance in connection with the substrate. The system also includes at least one second colorant mixture printed as an image upon the substrate in substantially close spatial proximity to the printed first colorant mixture, the resultant second colorant mixture having a property of low infrared reflectance in connection with the substrate and a property of low visual contrast against the first colorant mixture. The system further includes an image printed with the digital color printing system on the paper substrate, the image comprising at least said first colorant mixture and said second colorant mixture arranged in close spatial proximity to each other, the spatial image arrangement of the at least two colorant mixtures revealing an infrared mark to a suitable infrared sensitive device when the printed color image is exposed to infrared illumination.

Further disclosed in embodiments herein, is an infrared mark indicator comprising an infrared reflecting substrate and a first colorant mixture printed as an image upon the substrate, the first colorant mixture having a property of high infrared reflectance in conjunction with the substrate. The infrared mark indicator further comprises a second colorant mixture printed as an image upon the substrate in substantially close spatial proximity to the printed first colorant mixture, the second colorant mixture having a property of low infrared reflectance in conjunction with the substrate, and a property of low visual contrast against the first colorant mixture, such that the resultant printed substrate image suitably exposed to an infrared illuminant, will yield a discernable pattern evident as a infrared mark when viewed with an infrared sensing device.

DETAILED DESCRIPTION

Figure 1:
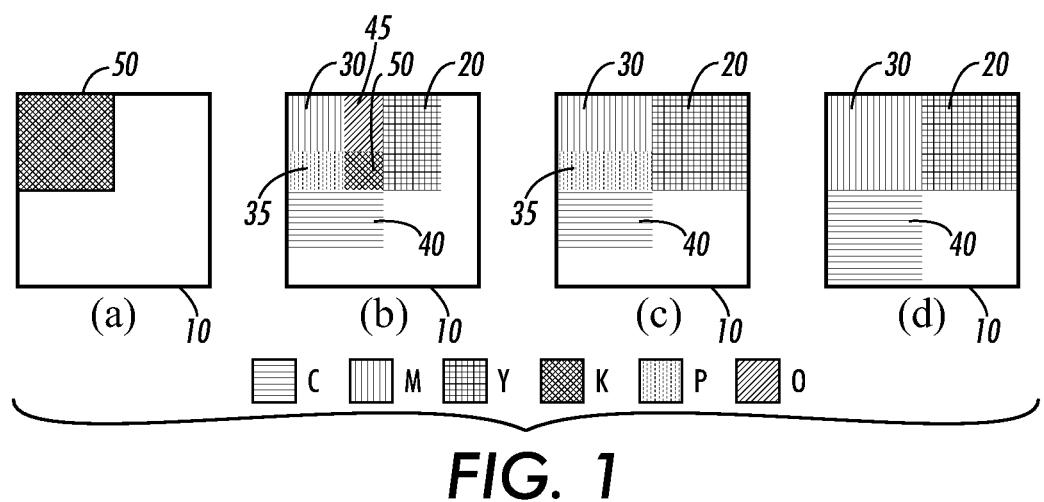
FIG. 1 schematically depicts metameric situations where different colorant combinations and distributions never-the-less lead to identical visual impression under normal illumination.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably. In the event that one term or the other is deemed to be narrower or broader than the other, the teaching as provided herein and claimed below is directed to the more broadly determined definitional term, unless that term is otherwise specifically limited within the claim itself.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation performs "image processing" when it operates on an item of data that relates to part of an image. "Contrast" is used to denote the visual difference between items, data points, and the like. It can be measured as a color difference or as a luminance difference or both. A digital color printing system is an apparatus arrangement suited to accepting image data and rendering that image data upon a substrate.

For the purposes of clarity for what follows, the following term definitions are herein provided:

Colorant: one of the fundamental subtractive C, M, Y, K, primaries, (cyan, magenta, yellow, and black)—which may be realized in formulation as, liquid ink, solid ink, dye, or electrostatographic toner.

Colorant mixture: a particular combination of C, M, Y, K colorants.

Infrared mark: a watermark embedded in the image that has the property of being relatively indecipherable under normal light, and yet decipherable under IR (Infra-Red) illumination by appropriate IR sensing devices, such as IR cameras.

Metameric rendering/printing: the ability to use multiple colorant combinations to render a single visual color, as can be achieved when printing with more than three colorants.

There is well established understanding in the printing industry regarding the utilization of infrared material inks in combination with infrared light sources as employed for security marks, particularly as a technique to deter counterfeiting or unauthorized copying. See for example: U.S. Pat. No. 4,603,970 to Aota et al.; and U.S. Pat. No. 3,870,528 to Edds et al., each of which is hereby incorporated by reference in its entirety for its teaching. However, there remains a long standing need for an approach to such a technique which will provide the same benefit but with lower complexity and cost, particularly in a digital printing environment, and using only common consumables as well. Herein below, teaching is provided regarding how the different infrared characteristics of toners can be incorporated in metameric printing which result in a different infrared response and which otherwise may never-the-less, escape the attention of an observer under normal lighting.

FIG. 1 depicts a conceptualization of metameric printing for a human observer. The visual response for a human observer is in most practical applications described sufficiently with a three component system, such as that defined by the International Commission on Illumination (CIE). In an idealized system with ideal toners, all four areas (10) of (a), (b), (c), and (d) of FIG. 1 will result in the same visual response under normal illumination. Inside the predetermined area 10, different amounts of yellow (20), magenta (30), cyan (40) and black (50) colorant are deposited, as in a standard four color printing process. Also, dependent on the overlap provided with the different colorants, the mixtures blue (35) and red (45) are created from cyan (40) and magenta (30), or yellow (20) and magenta (30) respectively.

Figure 2:
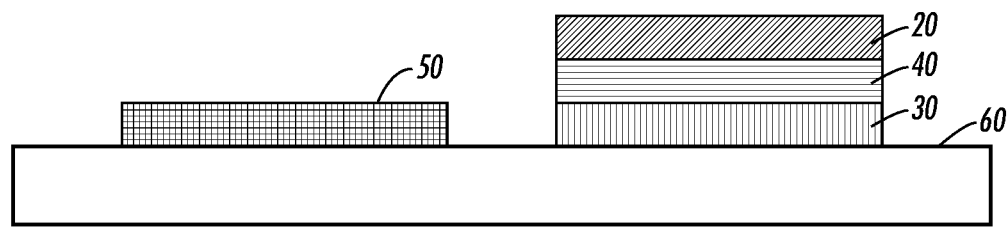
FIG. 2 schematically depicts in cross-sectional profile two instances where a single visual color black is achieved with different colorant combinations.

FIG. 2 in cross-section conceptually shows different ways in which the visual color black can be achieved either by using a black colorant (50), or in the alternative by the superposition of yellow (20), magenta (30), and cyan (40), colorants as printed onto the substrate print surface (60). The important aspect depicted by FIG. 2 is that a single color, in this case black, can be achieved by a multitude of metameric colorant combinations, of which but two are shown in this example. In general, every system that maps N components to n components with N>n, will have a multitude of ways to accomplish this mapping. It is understood by those skilled in the art that singularities might exist in the mapping so that certain visual triplets can only be achieved with a single or a small number of colorant quadruplets. Again, as will be understood by those skilled in the art, utilization of more than the standard four colorants is comprehended and contemplated in the claims below, and only omitted for clarity of explanation as being redundant and unnecessary for those skilled in the art.

As is provided by example in FIG. 1, the same visual color can be achieved with different amounts and combinations of the respective available colorants. However here-so-far, the infrared characteristics of the individual colorants has not been discussed. From FIGS. 1 (c) and (d) it should be clear from noting the overlap of magenta (30) and cyan (40) in (c), that the same amount of colorants have been used and all that has been changed is the spatial distribution only. In examples provided in FIGS. 1 (a) and (b) however, the black colorant (50) provided there could conceptually be replaced by a superposition of the three colorants yellow (20), magenta (30) and cyan (40) as is indicated in FIG. 2 without changing the visual perception of the color.

Under standard illumination, a human observer would not be able during normal observation scenarios to distinguish the way a rendered color was produced from amongst the various achievable colorant combinations. This commonly understood effect is often employed to select, as the best colorant combination from amongst the plethora of achievable combinations, that combination which favors some secondary requirement, such as: materials use, cost, stability, and the like. Indeed, as will be readily noted by those skilled in the art, under-color removal is often employed so as to maximize black, and minimize C, M and Y colorant usage, so as to thereby minimize the cost for rendering a given color page.

Figure 3:
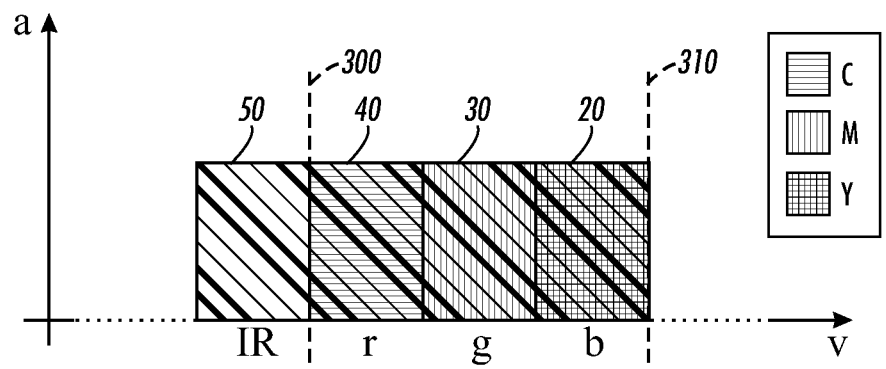
FIG. 3 provides a simplified depiction of idealized absorption for different colorants.

FIG. 3 depicts conceptually the absorption levels in spectral frequency bands of different colorant materials in an idealized system. As will be well understood by those skilled in the art, real colorants will deviate somewhat from this depicted idealized behavior, but here for the sake of clarity in explanation, assume that all colorants have absorption across unique frequency bands as shown. As further shown in FIG. 3: yellow (20) absorbs blue (b) while reflecting the red (r) and green (g) light components; magenta (30) absorbs green, while reflecting red and blue; and cyan (40) absorbs red while reflecting green and blue. Thus yellow absorbs in the blue spectra band, magenta absorbs in the green spectra band and cyan absorbs in the red spectra band. The important point to be made in FIG. 3 is that in general, black (50) as is indicated here by the diagonal lines, absorbs across all the red, green and blue, spectral bands, but also extends further down into the IR spectral region. The IR spectral region is delineated here to be that band to the left of dashed line 300. This empirically observed effect appears to be the resultant of the typical and common utilization of carbon black in the manufacture of black colorants.

As taught in the prior art directed to invisible infrared encoding, due to the absorption characteristics of carbon black in the infrared region, utilization of carbon black is commonly considered as 'not appropriate' and is taught away from. This results in the art teaching the use of non-carbon black toners, as is achieved by mixing other colorants as discussed above. For the purpose of teachings provided and claimed herein, we will limit our meaning of "black colorant" to be that typical usage of standard black (K) colorants having strong properties in both the visible and the infrared region, as indicated in the following table:

| Toner Colorant | Infrared Reflectance on Substrate | Perceived Intensity Absorption or Perceived Luminance Impact |
| --- | --- | --- |
| Black | Minimal | High |
| Cyan | High | High |
| Magenta | High | Medium |
| Yellow | High | Low |

It is understood that for the purpose of the teachings provided herein, the usage of the term "reflectance" as a characteristic is always considered as including the effects of the substrate (60) to which the rendered colorant is applied, and thus a high reflectance commonly refers to a transparent colorant for that wavelength regime applied to a highly reflective substrate.

The teachings as noted and described above when suitably employed, can present in combination with the teachings to follow below, an infrared-based watermarking technique that as taught herein, need only use common consumables. This exemplary technique finds foundation on the following observations: 1) common substrates used in digital printing are high infrared reflectors; 2) common cyan, magenta, yellow and other chromatic colorants are highly transmissive to infrared; 3) the common black colorant exhibits a strong infrared absorption, thus strongly reducing or even eliminating infrared reflection. This is because infrared radiation is absorbed before it can reach the reflective substrate surface, as well as any remaining infrared reflections being absorbed on the second return pass back through the black colorant.

This exemplary technique as taught herein works by finding colorant mask patterns that produce similar R (normal reflection) and so are hard to distinguish from each other under normal light, while also providing very dissimilar infrared reflections and thus displaying a high contrast from one another under infrared light. This dissimilarity in infrared reflections under IR illumination can be easily detected with a standard infrared sensitive camera. One example embodiment employs this difference by toggling between the black visual color caused by using a black colorant, and the black visual color caused by a combination of the cyan, magenta and yellow colorants, alternating the placement of each between either the background or foreground areas in close spatial proximity and complementary counter-opposition.

Figure 4:
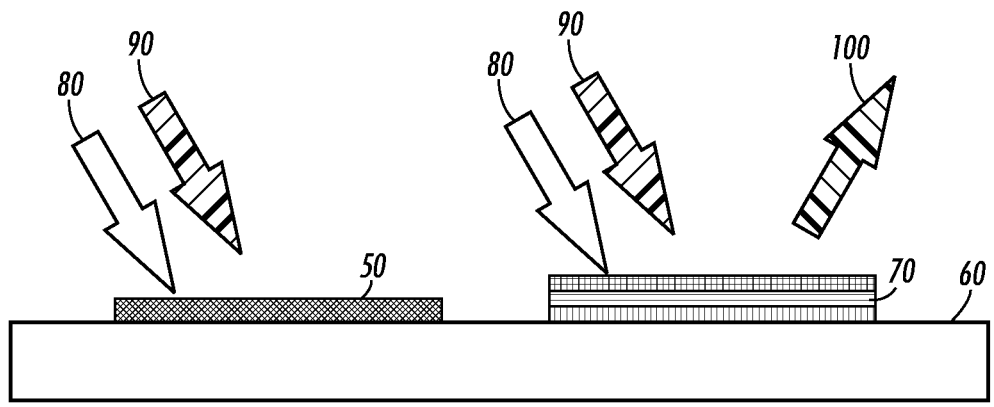
FIG. 4 depicts in cross-sectional profile the different infrared reflections between black colorant and chromatic colorant mixtures on a reflective substrate.

FIG. 4 shows the difference in infrared reflection for the scenario described in FIG. 2. The visible light (80) is absorbed by either black colorant (50) or chromatic colorant mixture (70) and no visible light is reflected from the toner/substrate combination. However, infrared radiation (90) is absorbed by the black colorant (50) but is transmitted by the chromatic colorant mixture (70) to the substrate (60). The infrared radiation is thus reflected at the substrate (60) and an overall infrared reflection (100) can be detected in the system Note that the proposed technique is distinct from the conventional approach in that instead of infrared behavior being separated from visually active colorants and added via application of special inks, infrared behavior is modified by selectively altering the colorant mixtures so that the desired visual color is reproduced at every location, while simultaneously the colorant mixtures are selected in a way that encodes the desired infrared signal.

Figure 5:
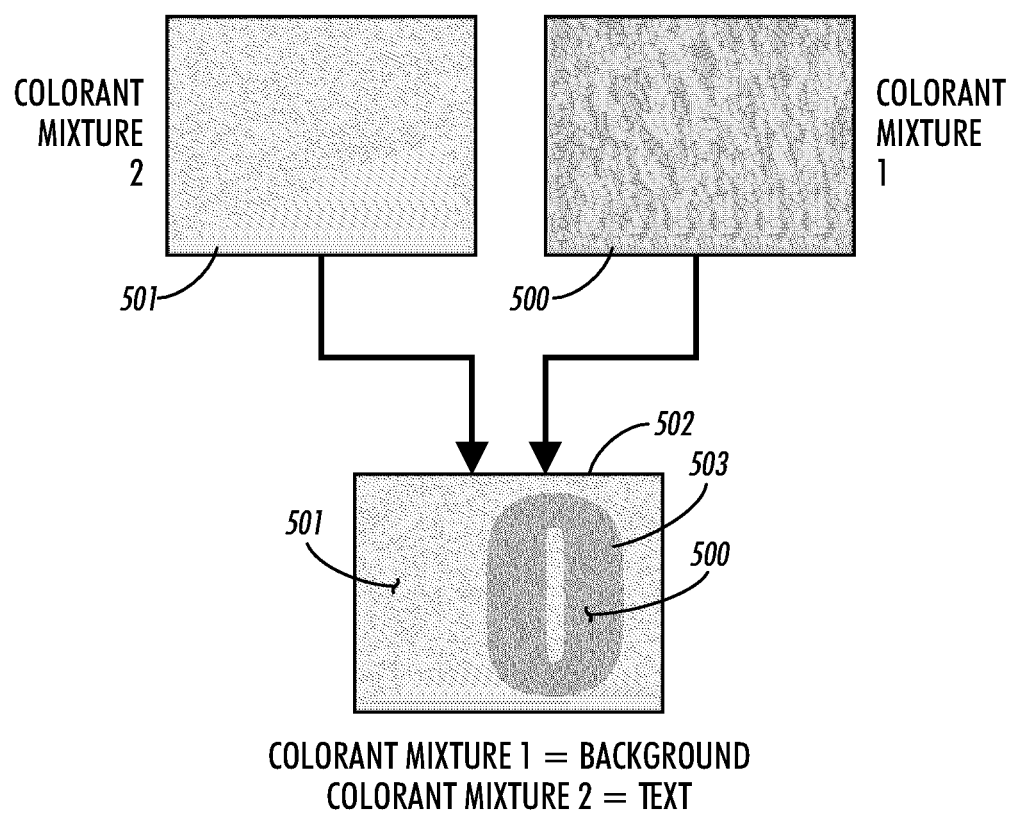
FIG. 5 provides depiction for one approach utilizing colorant or colorant mixtures as applied in the rendering of an example alphanumeric character.

FIG. 5 provides depiction for application of the teachings enumerated above. In FIG. 5, a colorant mixture-1 is selected and applied to patch area 503, which here is arranged in this example as the alphanumeric symbol "O". Further, a colorant mixture-2 is selected and applied to patch area 502 arranged here in substantially close spatial proximity to patch area 503, and thereby effecting a background around patch area 503. Both colorant mixture-1 and mixture-2 are comprised of suitably selected colorant or colorant mixtures 500 and 501 respectively.

Each colorant mixture 500 or 501 may be either a single CMYK colorant or any mixture of CMYK colorants. They will however, not both be comprised of the same identical single colorant or colorant mixture. Indeed for example, in one embodiment, colorant mixture 501 will be selected so as to provide higher infrared absorption/lower infrared reflectance than that selected for colorant mixture 500. However, in a preferred arrangement the colorant mixtures 500 and 501 will be selected most optimally to match each other closely in their average color under normal light, while at the same time differing in their average infrared response. Thus, under normal illumination, area 502 would look to a human observer as a constant or quasi constant color, while under infrared illumination area 502 would separate into two distinct areas represented by colorant mixtures 500 and 501 exhibiting a clear contrast to a infrared sensitive device such as an infrared camera. It should be noted that interchanging the colorant mixtures 500 and 501 simply leads to an inversion of the contrast, e.g.: light text on a dark background would change to dark text on a light background, and that this inversion is comprehended in the description even if not further explicitly discussed, as being well understood by those skilled in the art.

As a further example an approximate 50% grayscale gray colorant mixture may be realized with a halftone of black colorant only. This may then be matched against a colorant mixture comprising a high amount of yellow mixed with enough cyan and magenta to yield a similar approximate 50% grayscale gray colorant mixture. However, with the given high content of black colorant amount the single colorant halftone case will provide much higher absorption of infrared as compared to the colorant mixture. Thus and thereby two colorant mixtures may be realized which while appearing quite nearly identical under normal viewing illumination, will never-the-less appear quite different to the appropriate device under infrared lighting.

Further, as will be understood by those skilled in the art, this may be approached as an intentional exploitation of metamerism to reproduce the same color response from two different colorant mixtures under normal viewing illumination. Mixtures which are optimized to vary sufficiently in their average infrared absorption and are otherwise a close metameric match under normal room lighting.

It is understood that the description above also holds for cases where the colorants are infrared reflective and not infrared transmissive, since in both cases, a strong infrared reflection can be observed. However, for cases where the colorants are in themselves reflective, the order of colorant deposition becomes important and care has to be taken that the order use does not alter the desired properties. The preferred method nevertheless, is the use of common infrared absorbing black colorants contrasted in close spatial proximity with infrared transmissive chromatic colorants.

Thus as discussed and provided above is a watermark embedded in an image that has the property of being nearly indecipherable by the unaided eye under normal light, and yet can easily be detected with an infrared sensitive device under infrared illumination. This infrared mark comprises an infrared reflecting substrate, and a first spatial colorant mixture pattern printed as an image upon the substrate. The first spatial colorant mixture pattern has the characteristic of low infrared reflectance, as well as a property of low color contrast under normal illumination against a second spatial colorant mixture pattern. The second spatial colorant mixture pattern has a high infrared reflectance, and printed in close spatial proximity to the first colorant mixture pattern, such that the resulting printed image suitably exposed to an infrared illumination, will yield a discernable pattern evident as an infrared mark to the appropriate infrared sensing device.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An infrared mark indicator rendered by a device, comprising:
    an infrared reflecting substrate, including:
        a metameric image rendered from a first combination of at least two toner colorants applied to the substrate in amounts realized with halftones based on first pixel values;

a metameric background rendered from a second combination of at least two toner colorants applied to the substrate in different amounts realized as halftones based on second pixel values, the second combination having a modified infrared reflected behavior resulting from selected colorants and the amounts;

wherein the image and the background appear similar in visual color under normal illumination but include dissimilar infrared reflections under infrared illumination such that a contrast in infrared light reflected at the substrate is detectable with an associated sensing device.

2. The infrared mark indicator of claim 1 wherein the substrate is paper.

3. The infrared mark indicator of claim 2 wherein the first combination includes at least a primary colorant selected from the colorants of yellow, magenta, and cyan.

4. The infrared mark indicator of claim 1, wherein the colorants of the first and second combinations include an IR characteristic, and wherein an effect of the infrared illuminant causes the colorants to be transparent in conjunction with the substrate for wavelengths matching the IR characteristic.

5. The infrared mark indicator of claim 2 wherein the first colorant combination is a grayscale value comprised of black colorant, and the second colorant mixture is comprised of yellow, cyan and magenta to make a similar grayscale value match to the first colorant mixture grayscale value.

6. The infrared mark indicator of claim 5 wherein the black colorant is a carbon black toner.

7. A system for creating an infrared mark, comprising:
an infrared sensing device; and,
an infrared reflective paper substrate including a color formed by a first colorant combination of first amounts of at least two colorant toners with a high infrared reflectance in direct spatial proximity to a second colorant combination having a different infrared reflectance and having second amounts of at least two colorant toners therein;
wherein the color is realized as halftones based on amounts of the colorant toners in each of the first and second colorant combinations such that the first and second colorant combination appears visually similar under normal light, but reflectance of the substrate is detected by a sensing device as being different under IR illumination,
wherein the amount of infrared radiation reflected at the substrate is based on the amounts of the toner colorants.

8. The infrared mark indicator of claim 7 wherein the substrate is paper.

9. The infrared mark indicator of claim 8 wherein the first colorant combination includes a primary colorant.

10. The infrared mark indicator of claim 7, wherein the colorants of the first and second combinations include an IR characteristic, and wherein an effect of the infrared illuminant causes the colorants to be transparent in conjunction with the substrate for wavelengths matching the IR characteristic.

11. The infrared mark indicator of claim 8 wherein the first colorant combination is a grayscale value comprised of black colorant, and the second colorant combination is comprised of yellow, cyan and magenta to make a similar grayscale value match to the first colorant mixture grayscale value.

12. The infrared mark indicator of claim 11 where the black colorant is a carbon black.

13. An infrared mark indicator adapted for detection with an associated infrared sensing device, comprising:
an infrared reflecting substrate, including:
a metameric image rendered from a first combination of at least two toner colorants applied to the substrate in amounts realized with halftones based on first pixel values;
a metameric background rendered from a second combination of at least two toner colorants applied to the substrate in different amounts realized as halftones based on second pixel values, the second combination having a modified infrared reflected behavior resulting from selected colorants and a spatial distribution of the colorants;
wherein the image and the background appear similar in visual color under normal illumination but include dissimilar infrared reflections under infrared illumination such that a contrast in infrared light reflected at the substrate is detectable with the associated infrared sensing device.

14. The infrared mark indicator of claim 13 wherein the substrate is paper.

15. The infrared mark indicator of claim 14 wherein the first colorant combination is principally a primary colorant.

16. The infrared mark indicator of claim 13, wherein the colorants of the first and second combinations include an IR characteristic, and wherein an effect of the infrared illuminant causes the colorants to be transparent in conjunction with the substrate for wavelengths matching the IR characteristic.

17. The infrared mark indicator of claim 2 wherein the first colorant combination is a grayscale value comprised of black colorant, and the second colorant combination is comprised of yellow, cyan and magenta to make a similar grayscale value match to the first colorant mixture grayscale value.

18. The infrared mark indicator of claim 17 wherein the black colorant is a carbon black.

* * * * *